United States Patent [19]

Maloney et al.

[11] Patent Number: 5,308,806
[45] Date of Patent: May 3, 1994

[54] METHOD FOR IMPROVING REFRACTORY METAL FIBER REINFORCED MOLYBDENUM DISILICIDE COMPOSITES

[75] Inventors: Michael J. Maloney, Port St. Lucie; Ralph J. Hecht, North Palm Beach, both of Fla.

[73] Assignee: United Technologies Corporation, Hartford, Conn.

[21] Appl. No.: 819,559

[22] Filed: Jan. 13, 1992

[51] Int. Cl.⁵ .............................................. C04B 35/58
[52] U.S. Cl. ....................................... 501/95; 501/92; 501/97
[58] Field of Search ............................ 501/92, 95, 96

[56] References Cited

U.S. PATENT DOCUMENTS

| | | |
|---|---|---|
| 3,772,042 | 11/1973 | Stringer et al. ................. 501/92 |
| 4,016,313 | 4/1977 | Schrewelius ................. 501/92 X |
| 4,923,829 | 5/1990 | Yasutomi et al. ................. 501/95 |
| 4,927,792 | 5/1990 | Petrovic et al. ................. 501/92 |
| 4,935,118 | 6/1990 | Agarwal et al. ................. 204/421 |
| 4,970,179 | 11/1990 | Petrovic et al. ................. 501/92 |
| 5,000,896 | 3/1991 | Petrovic et al. ................. 501/92 X |
| 5,045,237 | 9/1991 | Washburg ................. 501/92 X |
| 5,069,841 | 12/1991 | Petrovic et al. ................. 501/92 X |

*Primary Examiner*—Karl Group
*Attorney, Agent, or Firm*—Herbert W. Mylius

[57] ABSTRACT

A method is taught for modifying the coefficient of thermal expansion of a molybdenum disilicide matrix material, so as to permit preparation of refractory metal fiber reinforced matrices having improved high temperature strength, creep resistance, toughness, and resistance to matrix cracking during thermal cycling.

14 Claims, 1 Drawing Sheet

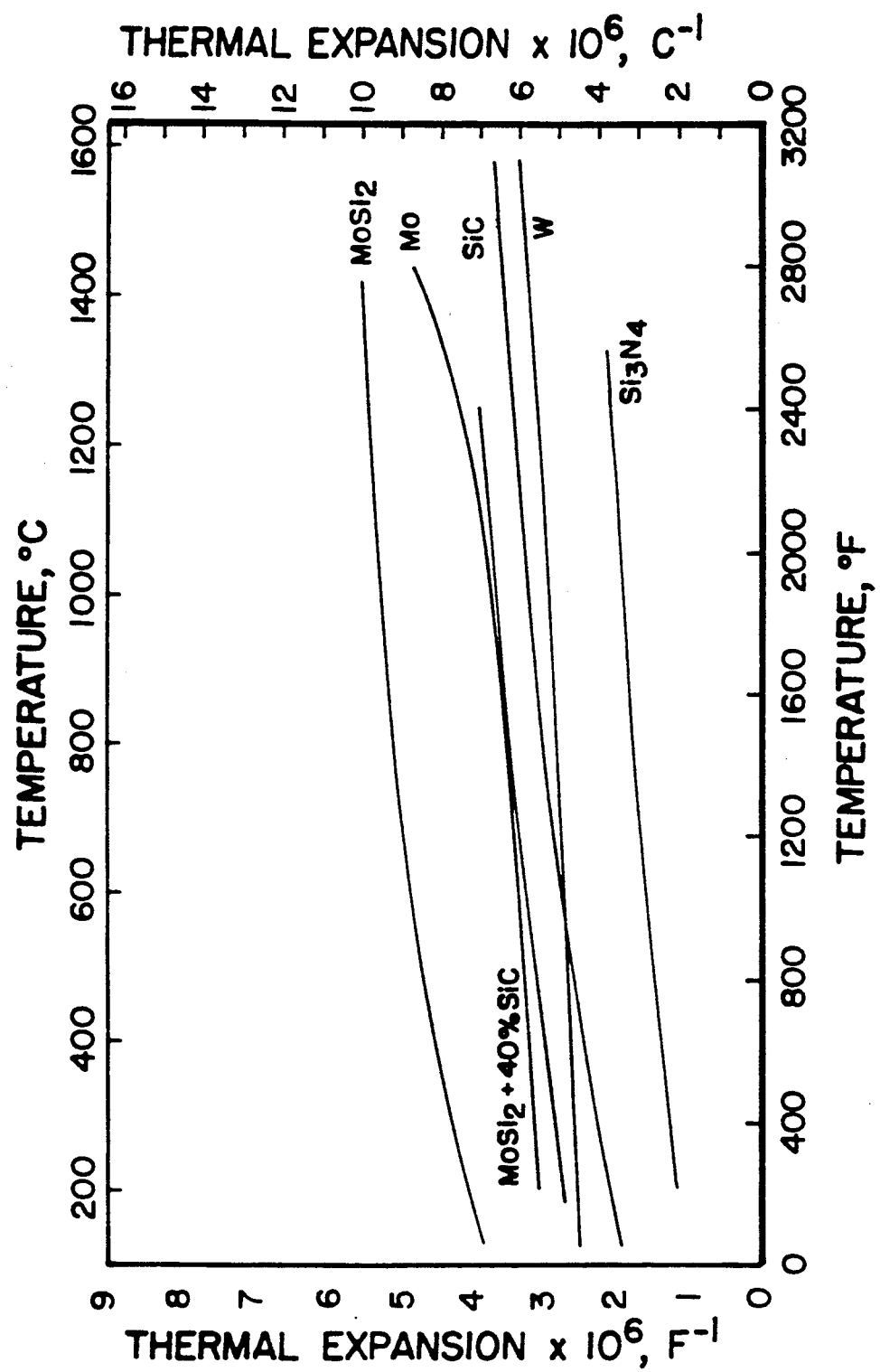

METHOD FOR IMPROVING REFRACTORY METAL FIBER REINFORCED MOLYBDENUM DISILICIDE COMPOSITES

The invention was made under a U.S. Government contract and the Government has rights herein.

BACKGROUND OF THE INVENTION

1. Field of the Invention

This invention relates to a method for improving reinforced intermetallic matrix composites, and particularly to modifying refractory metal fiber reinforced molybdenum disilicide matrices so as to improve high temperature strength, creep resistance, and toughness.

2. Description of the Prior Art

Molybdenum disilicide is an intermetallic compound with a melting temperature in excess of 2000° C., excellent high temperature oxidation resistance, and high thermal conductivity. Several problems, however, limit the use of molybdenum disilicide as a high temperature material, such as insufficient high temperature strength, creep resistance, and toughness. Accordingly, fiber reinforcement of molybdenum disilicide has been attempted, using continuous high strength refractory metal fibers such as tungsten and molybdenum. During thermal cycling, however, refractory metal fiber reinforced molybdenum disilicide matrices experience cracking caused by thermal stresses resulting from differences of thermal coefficients of expansion of the matrix and the reinforcing fiber. As disclosed herein, applicants have now found a method to form a refractory metal fiber reinforced molybdenum disilicide composite capable of withstanding such thermal stresses, by adding to the matrix a particulate material which modifies the coefficient of thermal expansion thereof, to a value close to that of the reinforcing fiber.

Attempts have been made previously to improve the high temperature capability of molybdenum disilicide matrix materials, such as by addition of silicon carbide whiskers. For example, Petrovic et al, in U.S. Pat. No. 4,927,792, disclose a molybdenum disilicide matrix composite which is reinforced with SiC whiskers throughout the matrix, to improve strength at high temperatures. The patentees' approach to overcoming matrix cracking during thermal cycling is to have the fibers in tension, and the surrounding matrix under compression, thus requiring a relatively high density of uniformly spaced fibers. Petrovic et al do not, however, suggest the inclusion of particulates to reduce the differences between the coefficient of thermal expansion of the $MoSi_2$ matrix and the reinforcing fibers.

Petrovic et al, in U.S. Pat. No. 4,970,179, disclose a modified $MoSi_2$ alloy matrix composite wherein the matrix contains from about 10 to about 30 percent SiC in the form of whiskers or submicron powder. In order to achieve increased strength at high temperatures, a portion of the $MoSi_2$ in the matrix is replaced with one or more refractory metal silicides, selected from tungsten disilicide, niobium disilicide, tantalum disilicide, molybdenum trisilicide, tungsten trisilicide, etc. Petrovic et al do not, however, suggest the inclusion of particulates to reduce the differences between the coefficient of thermal expansion of the $MoSi_2$ matrix and reinforcing fibers, and in fact do not suggest the inclusion of continuous refractory metal fibers to strengthen the matrix.

Washburn, in U.S. Pat. No. 5,045,237, discloses a refractory electrical device for use as a heating element, ignitor, and heat sensor, which contains fine powders of molybdenum disilicide, silicon carbide, and aluminum nitride which are sintered or hot pressed into rigid structures. The patent does not teach, however, the use of refractory metal reinforcing fibers.

Agarwal et al, in U.S. Pat. No. 4,935,118, disclose a self-heated oxygen sensor package having a heating element comprising silicon carbide, silicon nitride, or molybdenum disilicide, or mixtures thereof. The reference teaches the addition of silicon nitride to avoid false readings of oxygen content, but makes no disclosure of modifying thermal expansion coefficients or adding refractory metal reinforcing fibers.

Schrewelius, in U.S. Pat. No. 4,016,313, discloses a heat resistant material for use in kilns, and attempts to overcome decreased strength due to oxidation by filling the pores of the silicon carbide matrix material with an impregnate containing molybdenum disilicide and silicon. The reference, however, does not attempt to strengthen the matrix by the addition of refractory metal fibers, or to modify the thermal expansion coefficient of the matrix.

In summary, while the prior art has disclosed the addition of particulate materials to molybdenum disilicide matrices to modify the high temperature properties thereof, and the use of reinforcing fibers in matrices, the references have not taught the modification of the thermal expansion coefficient of the matrix to reduce stress between the matrix and a continuous refractory metal reinforcing fiber encompassed therein. Thus, the references have not overcome the problem of stress induced by thermal cycling of ceramic fiber reinforced molybdenum disilicide matrices.

SUMMARY OF THE INVENTION

The present invention comprises a method for the production of a molybdenum disilicide matrix capable of repeated thermal cycling, having improved high strength properties. It is an object of the present invention to provide a method to alter the coefficient of thermal expansion of a molybdenum disilicide matrix to more closely match that of the refractory metal fiber utilized as a reinforcing means.

It is also an object of the present invention to provide a method for producing a high temperature intermetallic composite comprising a matrix of molybdenum disilicide, a particulate inclusion to modify the coefficient of thermal expansion of said matrix, and a continuous refractory metal reinforcing fiber. It is a further purpose of this invention to provide a molybdenum disilicide matrix encompassing a thermal expansion coefficient modifying amount of a particulate material, and a reinforcing refractory metal fiber.

Thus, the present invention comprises the addition to a molybdenum disilicide matrix of from about 15 to about 60 percent by volume of a particulate modifying agent selected from submicron powders, platelets, and whiskers of silicon carbide, silicon nitride, boron nitride, or silica, or mixtures thereof, the composite further comprising from about 5 to about 60 volume percent of a continuous reinforcing fiber selected from tungsten, molybdenum, niobium, tantalum, and alloys of such metals.

BRIEF DESCRIPTION OF THE DRAWING

The FIGURE represents a graphical representation of the mean coefficients of thermal expansion of various materials utilized in the present invention.

DESCRIPTION OF THE PREFERRED EMBODIMENTS

Molybdenum disilicide is a promising intermetallic compound for high temperature structural applications, particularly in oxidizing atmospheres. However, molybdenum disilicide by itself lacks sufficient high temperature strength, creep resistance, and toughness, and therefore requires reinforcement with high strength fibers such as tungsten, molybdenum, niobium, titanium, or alloys of such refractory metals. Such fiber reinforced molybdenum disilicide materials, however, are subject to microcracking induced by thermal expansion mismatch during thermal cycling.

It has now been discovered that this problem may be overcome by modifying the coefficient of thermal expansion of the molybdenum disilicide matrix to closely approximate that of the refractory metal reinforcing fiber employed. This may be accomplished by the addition to the matrix of a suitable amount of particulate silicon carbide, silicon nitride, boron nitride, or silica, which materials have coefficients of expansion considerably lower than that of the molybdenum disilicide at substantially all temperatures, as illustrated in the FIGURE. The FIGURE also clearly illustrates the disparity between the mean coefficients of thermal expansion of molybdenum disilicide and molybdenum and tungsten, which can be utilized in the form of continuous fibers to reinforce matrices of molybdenum disilicide. Also illustrated is the mean coefficient of thermal expansion of a molybdenum disilicide matrix with 40 volume percent particulate SiC additive, in accordance with the present invention.

The molybdenum disilicide matrix materials suitable for use in the present invention comprise the commercially available powders of essentially pure molybdenum disilicide or molybdenum disilicide containing other silicide alloying materials, such as tungsten disilicide and/or rhenium disilicide or other small alloying additions. The matrix material should be utilized as a powder, having a particle size of from about 5 to about 14 microns, and preferably about 9 microns in diameter.

Commercially available refractory metal fibers, selected from tungsten, molybdenum, niobium, tantalum, and the alloys of such metals, may be utilized to act as the matrix reinforcement. The preferred fibers are tungsten alloys, such as tungsten-rhenium (up to about 50 weight percent Rh), tungsten-hafnium carbide (up to about 4 weight percent HfC), tungsten-thoria (from about 1 to about 4 weight percent $ThO_2$), tungsten-rhenium-hafnium carbide, potassium doped tungsten, and molybdenum alloys such as potassium doped molybdenum, molybdenum-rhenium (up to about 50 weight percent Rh), and molybdenum-hafnium carbide (up to about 4 weight percent HfC). Suitable fibers include W-1$ThO_2$, W-1.5$ThO_2$, W-3Re, W-5Re, W-25Re, W-0.35HfC, W-4Re-0.35HfC, K doped W, K doped Mo, Mo-0.6HfC-0.5C, Nb-28W-2-Hf-0.06C, and Nb-11W-28Ta-1Zr. The fiber may be present in the final composite in an amount appropriate to achieve the desired strengthening, such as from about 5 to about 60 volume percent of the final composite, preferably from about 20 to about 40 volume percent, and most preferably from about 30 to about 40 volume percent. The Figure, however, clearly indicates the mismatch of thermal expansion which may occur when utilizing such reinforcing fibers, particularly tungsten, in a molybdenum disilicide matrix, and how that mismatch may be decreased by the addition of particulate silicon carbide to a molybdenum disilicide matrix.

Such fibers, having a diameter of, for example, about 125 microns, may be drawn through a binder-powder mixture to apply a coating of molybdenum disilicide and particulate modifying agent, in a bonding resin, to the surface of the fibers. The thus coated reinforcing fibers may then be assembled in layers, e.g. in the form of a tape, or in bundles, which may then be grouped as desired and subjected to appropriate fabrication techniques to remove the binder and form the desired composites. It is also appropriate, when utilizing refractory metal reinforcing fibers, to apply a protective barrier coating to the surface thereof to prevent silicon diffusion in the interface between the fiber and the molybdenum disilicide matrix. Such diffusion barrier coatings may be applied by conventional techniques, such as chemical vapor deposition or sputtering, and include aluminum oxide ($Al_2O_3$), yttria ($Y_2O_3$), YAG ($3Y_2O_3 \cdot 5Al_2O_3$), mullite ($3Al_2O_3 \cdot 2SiO_2$), zirconia ($ZrO_2$), titanium carbide (TiC), tantalum carbide (TaC), and zirconium carbide (ZrC).

It has been found that the coefficient of thermal expansion of molybdenum disilicide may be altered by the addition thereto of particulate silicon carbide, silicon nitride, boron nitride, or silica, or mixtures thereof. Such modifying material may be added to the molybdenum disilicide in the form of submicron powder, platelets having, for example, an aspect ratio of up to about 50:1, or whiskers having, for example, an aspect ratio of up to about 100:1. The amount of particulate to be utilized will be dependent upon the coefficient of thermal expansion of the refractory metal reinforcing fiber to be employed, the amount of refractory metal fiber to be present in the final composite, the diameter of said refractory metal fiber, and the temperature ranges through which the desired composite is to be cycled. The specific proportion of particulate to be present in the matrix of the composite may be determined experimentally, or theoretically, to achieve the desired reduction in cracking. In general, however, the particulate may be present in amounts approximating from about 15 to about 60 volume percent of the matrix. The preferred amount of particulate preferably constitutes from about 20 to about 60 volume percent of the matrix, and most preferably from about 30 to about 60 volume percent. It is noted that silicon nitride has, from about 200° F. to about 2600° F., a lower coefficient of thermal expansion than silicon carbide, and may thus be anticipated to have a greater modifying effect upon the coefficient of thermal expansion of molybdenum disilicide than an equal amount of silicon carbide. It is possible to achieve very close approximations of the mean coefficient of thermal expansion of the reinforcing fiber over a given temperature range by mixing varying amounts and forms of silicon carbide, silicon nitride, boron nitride, and silica particulates in the matrix.

EXAMPLE 1

As shown in the Figure, tungsten has a lower coefficient of thermal expansion than molybdenum disilicide at all temperatures. During cooling of a tungsten reinforced molybdenum disilicide matrix, composite tensile stresses develop in the matrix due to the differential thermal expansion, resulting in matrix cracking. Silicon nitride has a considerably lower coefficient of thermal expansion than either tungsten or molybdenum disilicide, as shown in the Figure. The addition of about 40 volume percent of silicon nitride to the molybdenum disilicide matrix resulted in a matrix material having a lower coefficient of thermal expansion than molybdenum disilicide over the temperature range considered.

EXAMPLE 2

As set forth in Example 1, a molybdenum disilicide matrix material was prepared, using silicon carbide rather than silicon nitride particulate. Silicon carbide has a somewhat lower coefficient of thermal expansion than the molybdenum disilicide matrix, although slightly higher than that of tungsten, as shown in the Figure. The addition of about 40 volume percent of silicon carbide resulted in a matrix material having a coefficient of thermal expansion between that of molybdenum disilicide and tungsten over the temperature range considered.

EXAMPLE 3

A tungsten alloy fiber reinforced molybdenum disilicide matrix composite was prepared, formulated to provide 20 volume percent silicon carbide platelets and 20 volume percent silicon powder in the matrix. A tungsten alloy fiber, comprising 3 weight percent rhenium, i.e. W-3Re, obtained from GTE Products, and bearing a diffusion barrier of alumina, was coated with a binder-powder mixture containing $MoSi_2$ powder obtained from Herman Stark Co., and having an average particle size of about 9 microns, SiC platelet obtained from C-Axis Technologies, and SiC powder obtained from Lonza Corporation. The matrix and modifier particulates were suspended in a NeoCryl B-700 methacrylate polymer commercially available from ICI Resins, dissolved in a solvent comprising 70 volume percent heptane and 30 volume percent acetone, to which was added 2 weight percent ethylene glycol. The binder and the particulate materials were present in a ratio of 2:7, although this ratio could be varied to suit the amount of particulate matrix and modifier it is desired to impart to the fiber surface. Alternatively, a Rhoplex methyl methacrylate polymer binder, available from Rhom & Haas, or other suitable binders, could be used in place of the NeoCryl. After passage through the binder-powder material, the fiber was passed through a furnace at about 165° F. to fuse the binder resin, thus forming a tungsten alloy fiber having a sheath of organic resin containing $MoSi_2$ and SiC particulates. This fiber was then wound about a drum adapted to receive the web of fibers and deposit of binder-powder, and formed into a tape. Sections of tape formed by this technique were then assembled into a stack and subjected to hot pressing at about 2550° F. for about 1.5 hours at about 4 Ksi pressure. The thus consolidated composite, with the resin burned out, was then subjected to hot isostatic pressing at about 2510° F. for about 1 hour at about 35 Ksi pressure, to form a fully consolidated composite. It was found upon testing of the composite that the addition of the particulate silicon carbide phase to the matrix resulted in a substantial reduction in composite matrix expansion and in matrix cracking when subjected to cycling between high and low temperatures. A substantial improvement in creep rate was noted at 2190° F. and 10 Ksi pressure, with the composite demonstrating a creep rate of $4.12 \times 10^{-8}$ per second, and the monolithic molybdenum disilicide having a creep rate of $1.79 \times 10^{-7}$ per second, a factor of 4 improvement. Fracture toughness of the composite measured 16 $MPa\sqrt{m}$, while the monolithic molybdenum disilicide measured 4.5 $Mpa\sqrt{m}$, a factor of 3 improvement.

EXAMPLE 4

A molybdenum disilicide matrix composite similar to that of Example 1 was prepared, utilizing a potassium doped molybdenum reinforcing fiber, coated with an aluminum oxide diffusion barrier. It was found that the addition of the particulate phase to the matrix was effective in lowering the coefficient of thermal expansion of the matrix and preventing matrix cracking. Further, a factor of 70 improvement in creep rate was obtained, with the composite yielding a creep rate of $7 \times 10^{-8}$ per second, as compared to the monolithic measuring $5 \times 10^{-6}$ per second at 2010° F. and 14.5 Ksi pressure. A 25 fold improvement in fracture toughness was also measured, with the composite yielding 125 $Mpa\sqrt{m}$ and the monolith 4.5 $MPa\sqrt{m}$.

Similar results are obtained utilizing 40 volume percent silicon nitride in a molybdenum disilicide matrix reinforced by a tungsten alloy fiber.

It is to be understood that alternative methods for the preparation of the composites themselves are available, and that the above description of the present invention is susceptible to considerable modification, change, and adaptation by those skilled in the art, and that such modifications, changes, and adaptations, are to be considered within the scope of the present invention, which is set forth by the appended claims.

What is claimed is:

1. A method for increasing the high temperature strength, creep resistance, toughness, and resistance to thermal cycling matrix cracking of refractory metal fiber reinforced molybdenum disilicide composites, said method comprising adding to the matrix of said composite sufficient particulate modifying agent selected from the group consisting of silicon nitride, silicon carbide, boron nitride, silica, and mixtures thereof to decrease the coefficient of thermal expansion of said matrix.

2. The method of claim 1, wherein said fiber is selected from the group consisting of tungsten, molybdenum, niobium, tantalum, and alloys thereof.

3. The method of claim 2, wherein said modifying agent comprises from about 15 to about 60 volume percent of said matrix.

4. The method of claim 3, wherein said fiber comprises from about 5 to about 60 volume percent of said composite.

5. The method of claim 4, wherein said modifying agent comprises from about 20 to about 60 volume percent of said matrix.

6. The method of claim 8, wherein said fiber comprises from about 20 to about 40 percent by volume of said composite.

7. The method of claim 6, wherein said modifying agent comprises from about 30 to about 60 percent by volume of said matrix.

8. The method of claim 7, wherein said fiber comprises from about 30 to about 40 volume percent of said composite.

9. In a process for producing a refractory metal fiber reinforced molybdenum disilicide composite, the improvement comprising adding to the matrix of said composite a particulate modifying agent selected from silicon carbide, silicon nitride, boron nitride, silica, and mixtures thereof.

10. The improvement of claim 9, wherein said modifying agent is selected from submicron powders, platelets, and whiskers of silicon nitride, silicon carbide, and mixtures thereof.

11. The improvement of claim 10, wherein said fiber is selected from the group consisting of tungsten, molybdenum, niobium, tantalum, and alloys thereof.

12. The improvement of claim 11, wherein said modifying agent is selected so as to decrease the coefficient of thermal expansion of said matrix and comprises from about 15 to about 60 volume percent of said matrix.

13. The improvement of claim 12, wherein said fiber comprises tungsten, and said modifying agent comprises from about 20 to about 60 volume percent of said matrix.

14. The improvement of claim 12, wherein said fiber comprises molybdenum and said modifying agent comprises from about 20 to about 60 volume percent of said matrix.

* * * * *

UNITED STATES PATENT AND TRADEMARK OFFICE
CERTIFICATE OF CORRECTION

PATENT NO.   :   5,308,806

DATED        :   May 3, 1994

INVENTOR(S)  :   Michael J. Maloney et al

It is certified that error appears in the above-identified patent and that said Letters Patent is hereby corrected as shown below:

Column 6, claim 6, line 57, change "claim 8," to --claim 3,--

Signed and Sealed this

Sixteenth Day of August, 1994

Attest:

BRUCE LEHMAN

Attesting Officer    Commissioner of Patents and Trademarks